Figure 1:
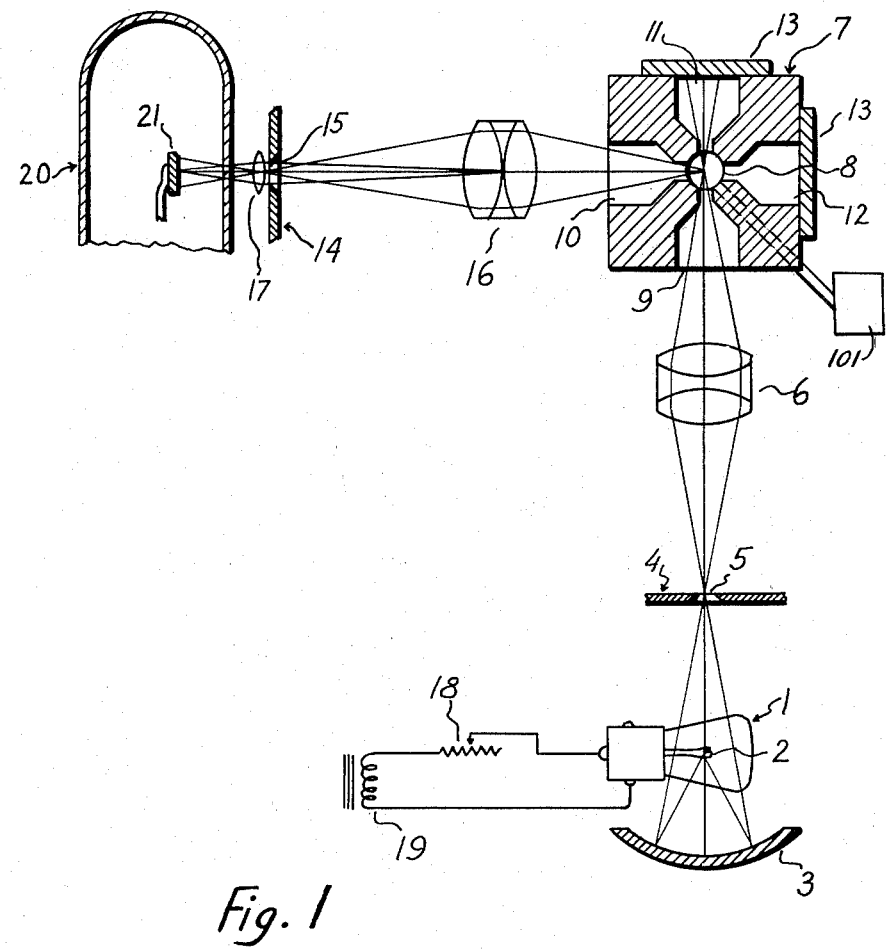

Dec. 25, 1956 J. C. FROMMER 2,775,159
METHOD AND APPARATUS FOR THE COUNTING OF
PARTICLES PER UNIT VOLUME IN A FLUID
Filed Feb. 20, 1952 2 Sheets-Sheet 1

Joseph C. Frommer
INVENTOR.

Joseph C. Frommer
INVENTOR.

United States Patent Office 2,775,159
Patented Dec. 25, 1956

2,775,159

METHOD AND APPARATUS FOR THE COUNTING OF PARTICLES PER UNIT VOLUME IN A FLUID

Joseph C. Frommer, Cincinnati, Ohio

Application February 20, 1952, Serial No. 272,590

7 Claims. (Cl. 88—14)

This invention relates to the determination of the number per unit volume of such particles present in a fluid that can be recognized by some optical, electrical or other method, and more particularly to the counting of dust particles present per unit volume in air.

According to present art such counting can be done in the following way: Air is sucked through an inspection chamber. A certain part of this chamber is inspected by optical or other means. We will refer to the inspected portion of the chamber as to the "inspection zone." The amount of air passing through the inspection zone during a certain test stroke or per unit of time is determined and the number of particles passing the inspection zone during the same inspection stroke or per unit time is counted. Division of the count of particles by the volume of air passed during the same time yields the number of dust particles per unit volume.

By dividing the unit volume by the number of particles per unit volume we obtain that volume which, in the average, would contain exactly one particle. We will refer to this volume as: "average volume pertaining to one particle."

It will be noted that present methods depend on the determination of two variables, viz. volume or volume per unit time and count or count per unit time. According to the present invention I suck the fluid to be tested through an inspection zone the volume of which is substantially less than the average volume pertaining to one particle, I provide means to detect whether at any moment a particle is within the inspection zone or not and determine in what fraction of the total time particles are present in the inspection zone. Division of the volume of the inspection zone by this fraction yields the average volume pertaining to one particle. Division of this average volume pertaining to one particle into the unit volume yields the number of particles per unit volume. In a preferred embodiment of the invention said fraction of the time during which particles are present in the inspection zone is determined by keeping an intermediate point of an amplifier at a first voltage during such time as no particles are present in the inspection zone, keeping it at a second voltage during such time as particles are present in the inspection zone and determining the average voltage of said point. As a numerical example we may inspect an inspection zone having a volume of $10^{-7}$ cu. ft. If we find that whilst drawing a certain sample of air through the inspection zone, particles to be counted are present during one tenth of the total time, then we know that the average volume pertaining to one particle is $10^{-7}/(1/10)=10^{-6}$ cu. ft., and the number of particles per cu. ft. is $1/10^{-6}=10^6$.

As will be seen later, the preferred embodiment to be described does not discriminate between the presence of one particle in the inspection zone and the simultaneous presence of two or more particles there. However, if the volume of the inspection zone is kept small compared to the average volume pertaining to one particle, the simultaneous presence of two or more particles in the inspection zone will be rather rare and correction factors can be established to correct for the error introduced by such coincidence.

It is an object of the invention to provide a new and improved method and device for determining the number of particles per unit volume present in a fluid, and more particularly the number of dust particles per unit volume present in air.

Another object of the invention is to make this determination independent from variations of the speed at which the inspected fluid is being sampled as long as this speed stays within certain limits.

Another object of the invention is to make this determination independent from the size of the particles as long as this size is within certain limits.

Another object of the invention is to provide adjustment of the lower limit of the size of the particles being counted.

Another object of the invention is to improve the signal to noise ratio of the detection of particles in a fluid.

Figure 2:
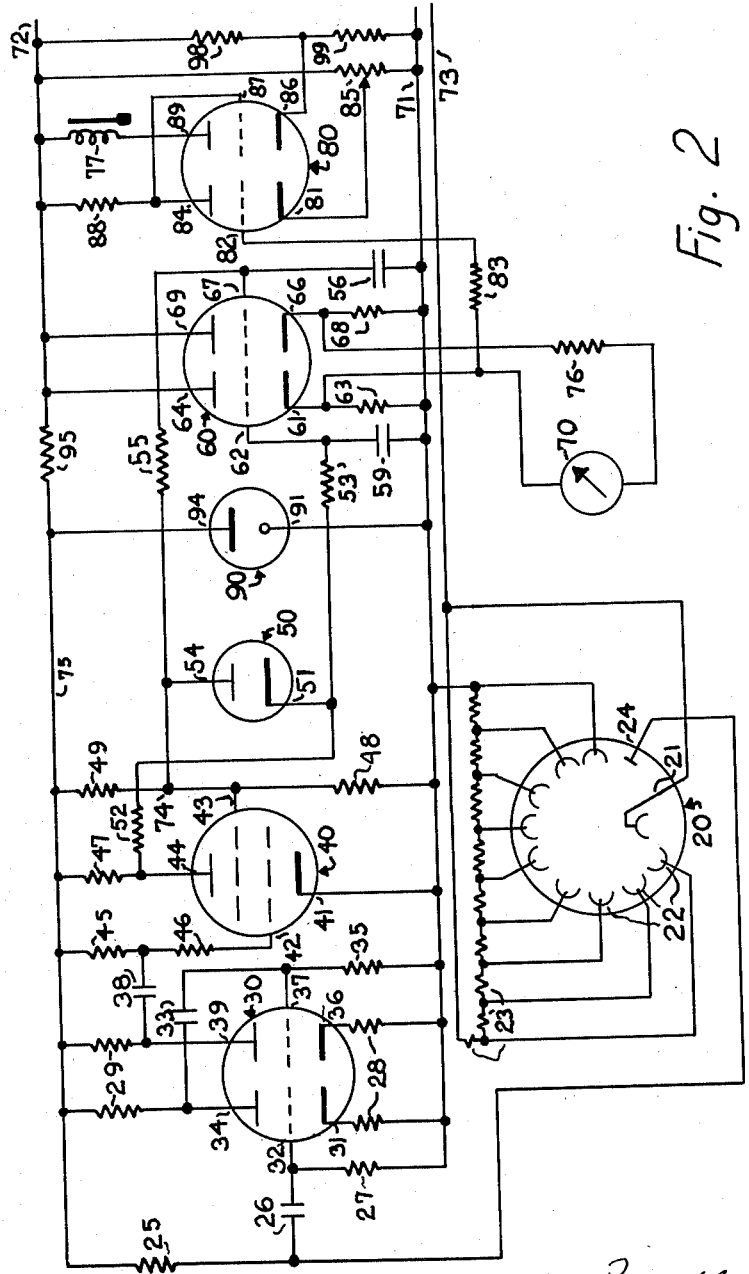

Other objects and advantages of the invention will be apparent in connection with the description of the drawings of which:

Fig. 1 is a schematic cross sectional diagram of the optical layout of a preferred embodiment of the invention and Fig. 2 is the circuit diagram of an amplifier used in connection with this layout.

Referring to Fig. 1, 1 is a lamp having a filament 2, heated through a variable resistor 18 from a secondary winding 19 of a transformer, not shown. 3 is a concave mirror, 4 is an opaque mask having a transparent aperture e. g. a hole 5; 6 is a lens, 7 is a block provided with a cylindrical hole 8 serving as an inspection chamber and provided with four holes, 9, 10, 11 and 12 having each two cylindrical and one conical portion. 13 denotes opaque covers, 16 a second lens, 14 a second opaque mask having a transparent aperture 15. 17 is a third lens and 20 is a photomultiplier having a cathode 21. The other electrodes of this multiplier are not shown in this drawing.

A blower, indicated diagrammatically at 101, sucks the air to be tested through hole 8 at a speed of, say 40 in./sec. The light of filament 2 is thrown by the mirror 3 onto the aperture 5. Lens 6 projects an image of this illuminated aperture into the center of hole 8 and illuminates therefore a volume flaring out in both directions from a cross section similar to the aperture 5. Lens 16 focuses the aperture 15 into the center of hole 8. The optical axes of these two lenses intersect at an angle of 90° (other angles different from 0 to 180° may also be used as long as provisions are made to intercept all stray rays from lens 6 to lens 16) and an observer situated behind aperture 15 could see that portion of the volume illuminated through aperture 5, which is cut out of this volume by rays proceeding from lens 16 toward the borders of the image of aperture 15. This portion then will be the inspection zone of the instrument. Hole 5 may be a square hole $1/16''$ x $1/16''$ imaged 1:1 and hole 15 may also be imaged 1:1, it may be a hole $1/16''$ wide and $1/8''$ long in the direction perpendicular to the plane of the drawing, this latter dimension being adjusted to reach $1/32''$ above and $1/32''$ below the illuminated area. The inspection zone will then have a volume of $(1/16)^3$ cu. ins. The cathode 21 of photomultiplier tube 20 faces hole 15 and the lens 17 focuses lens 16 onto the photocathode 21. Forming an image of the objective lens on the photocathode has the advantage that in this way the light scattered from particles in any part of the inspection zone will be evenly distributed over the image of the objective and particles of equal size and color will give exactly equal photoelectric input, despite variations in the sensitivity of various parts of the photocathode. The drawing represents a photocathode having, according to the present invention, a circular shape of the size of the image of lens 16 formed by lens 17. To reduce spurious signals, it is of advantage to form an image as small as possible, say well below one quarter of an inch in diameter and make the sensitive portion of the cathode not greater than this image plus whatever addition is necessary to take care of misalignment so that all light gathered by the objective reaches the cathode or to make the photocathode somewhat smaller than the image of the objective, so that, despite slight misalignments, the entire sensitive cathode surface is illuminated if the objective lens picks up light. However a commercially available photomultiplier tube e. g. of the type 931A could also be used. The instrument is carefully shielded from outside light, its inside is painted with optical black. The light proceeding from lens 6 past the inspection zone is trapped by hole 11 and cover 13. Hole 12 and the other cover 13 insures that stray reflection still present on the walls of hole 8 can find no direct way toward aperture 15.

As long as no particle of dust is present in the inspection zone, this inspection zone appears entirely dark and the multiplier tube 20 obtains no input signal. If a dust particle is present in the inspection zone, it scatters the light falling on it. Part of this scattered light will reach the second lens 16 and will be directed by it through aperture 15 and lens 17 onto the photocathode 21 of multiplier tube 20. Thus this cathode is illuminated as long as a particle of dust is present in the inspection zone and it is not illuminated during the rest of the time.

The photomultiplier is connected into the circuit shown in Fig. 2. In this figure 21 denotes the cathode, 24 the anode and 22 the dynodes of photomultiplier tube 20. 30 is a twin triode having cathodes 31, 36; grids 32, 37; and anodes 34, 39. 40 is a pentode having a cathode 41, a grid 42, a screen 43, a suppressor grid connected to cathode 41 but not shown, and an anode 44. 50 is a diode having a cathode 51 and an anode 54. 60 is a second twin triode having cathodes 61, 66; grids 62, 67; and anodes 64, 69. 80 is a third twin triode having cathodes 81, 86; grids 82, 87; and plates 84, 89. 90 is a voltage regulator tube having a cathode 91 and an anode 94. 70 is an indicating or recording instrument having a full scale reading of, say, 1 milliampere. 85 is an adjustable voltage divider and 77 is a relay.

The circuit is powered by a positive plate supply of, say, 300 volts D. C. applied between leads 71 and 72; a negative plate supply of, say, 900 volts D. C. applied between leads 73 and 71; and a filament supply of, say 6.3 volts A. C. connected to the filaments of the amplifier tubes. These supplies may be of conventional design and are not shown in the drawing.

The cathode 21 of the multiplier tube 20 is connected to the negative supply line 73 and its dynodes are connected to the taps of a voltage divider formed by resistors 23 connected in series with each other between the negative line 73 and the common reference line (often called ground line) 71. The anode 24 of the photomultiplier tube is connected, through resistor 25 of say, 100,000 ohms, to a line 75 held at a constant potential of, say, 150 volts, by voltage regulator tube 90. Its output signal is transmitted through capacitor 26 of, say, .005 mfd. to grid 32 of twin triode 30. The two systems of this triode, with the associated resistors 27, 28, 29, 35, and with condenser 33 form a conventional voltage amplifier whose output is transmitted via capacitor 38 to the common point of resistors 45, 46. The other end of resistor 45 which may be 10 megohms is connected to the line 75, the other end of resistor 46 which may be 1 megohm is connected to grid 42 of pentode 40. The plate 44 of this pentode is fed through a conventional load resistor 47 of, say, 330,000 ohms from the regulated line 75 and it is connected through resistor 52 of, say 1 megohm, to cathode 51 of diode 50. The anode 54 of this diode is connected to the common point 74 of resistors 48, 49, and supplies a constant voltage of, say, 60 volts both to this point and to the screen 43 of pentode 40. Grid 62 of twin triode 60 is connectd to diode cathode 51 via resistor 53 of, say, 2.2 megohms and to the reference line 71 via capacitor 59 of, say, 0.1 mfd. Grid 67 is connected to point 74 through resistor 55 of, say, 2.2 megohms and to the reference line 71 through capacitor 56 of, say, 0.1 mfd. Cathode 61 is connected to the reference line 71 via resistor 63 of, say, 20,000 ohms, and cathode 66 is connected to the same reference line via resistor 68 of, say, 12,000 ohms. Plates 64, 69 are connected to the positive supply line 72. Meter 70 is connected across the cathodes 61, 66 via resistor 76 of, say, 12,000 ohms.

The cathode 81 of twin triode 80 is connected to the tap of the adjustable voltage divider 85 of, say, 100,000 ohms resistance, grid 82 of the same triode system is connected to cathode 61 of tube 60 through resistor 83 of, say, 2.2 megohms, and the plate 84 of this triode system is connected to the positive supply line 72 through resistor 88 of, say, 1 megohm. Grid 87 of the second triode system of twin triode 80 is connected to plate 84 of the first triode system, cathode 86 of this second system is connected to the midpoint of the voltage divider formed by resistors 98, 99, where the voltage is kept around, say, 150 volts positive with respect to line 71 and the plate of this second triode system is connected to the positive line 72 through relay 77.

As was said in connection with Figure 1, the cathode 21 of photomultiplier 20 is illuminated or not, according to whether a particle of dust is present in the inspection zone or not. Accordingly anode 24 will assume a more negative potential whenever a dust particle is present, than during the rest of the time, and for the same duration an amplified negative signal will appear on anode 39 and on both sides of capacitor 38.

The grid current flowing through resistors 45, 46 keeps the side of capacitor 38 connected to their junction at a voltage of, say, plus 13 volts with respect to the cathode 41. As long as the amplitude of a signal on plate 39 is below this voltage, it cannot drive the grid 42 into the negative region and it will have very little effect on the plate current of 40. Therefore the signals originating from random noise in the multiplier tube and from too small particles are suppressed. Bigger particles of dust cause a higher amplitude; they drive the grid 42 into the cutoff region and cause the plate 44 to assume a high positive potential. The time constants of the amplifier have been chosen to be substantially longer than the duration of the passage of a particle of dust and therefore plate 44 will stay positive for this full duration. For the rest of the time the plate will assume a potential of only a few volts above the cathode potential. The voltage of plate 44 is averaged on the grid 62 of twin diode 60. To prevent the variations of the plate voltage of tube 40 during conduction from influencing the indications of the instrument, diode 50 is inserted with its plate 54 connected to point 74 and its cathode 51 connected to the junction of resistors 52, 53 which connect plate 44 to the averaging grid 62. Diode 50 will let its cathode go as positive as caused by plate 44 when a signal is present on its grid, but it will prevent the junction of resistors 52, 53 from assuming a voltage below the constant voltage on diode plate 54, during conduction of tube 40. Thus grid 62 will average between an upper voltage on junction of resistors 52, 53 well determined by complete absence of plate current in pentode 40, and a lower voltage on junction of resistors 52, 53 corresponding to current in pentode 40, but kept at a constant value by diode 50. In this way the averaged voltage will be indicative of the fraction of the time during which a sufficiently high negative signal was present at the grid 42 of tube 40, i. e. of the fraction of time during which particles of dust of the specified size or bigger were present in the inspection zone.

Both systems of twin triode 60 are connected as cathode followers and accordingly their cathodes will assume voltages substantially equal to the voltages on the respective grids. Grid 67 is kept permanently at the voltage of point 74, grid 62 is kept at a voltage derived from averaging between that of point 74 and a constant higher voltage. Therefore the difference between the voltages on these grids and consequently the difference between the voltages on the two cathodes is indicative of the fraction of time during which particles of dust are present in the inspection zone. This difference is indicated by meter 70. It also controls triode 80 to actuate relay 77 whenever the indication of meter 70 exceeds some limit which can be adjusted by the potentiometer 85. Where in the appended claims the terms "indicating means'" is employed, this term is to be understood as including any suitable means which in addition to, or instead of, the meter 70 operate in response to the difference between the voltages on the two grids or the two cathodes of the twin-triode 60. This means may be a signalling means or an actuating means, e. g. the previously mentioned relay 77.

It will be noted that the indication of meter 70 will be independent from the speed at which air is being sucked through the chamber 8, as long as the amplifier is capable of keeping the tube 40 in cut off during the time which it takes for a particle to travel through the inspection zone. The amplifier can be adapted to higher speeds, lower speeds or wider bands of speed if so desired, by conventional methods. It will also be noticed that the amplifier is entirely insensitive to particles that give a signal having an amplitude below the positive voltage existing at junction of resistors 45, 46, and that it will be equally sensitive to all particles, the signal of which transgresses this voltage by the (relatively small) voltage necessary to drive pentode 40 into cut off. If this threshold is to be shifted toward particles of bigger or smaller size (or for the same size, toward brighter or darker particles), the voltage supplied to the lamp illuminating the inspection zone can be varied by the variable resistor 18 shown on Fig. 1, or the voltage applied on point 73 to the multiplier may be changed.

The lower limit of particle size detectable is determined by the random noise present in the multiplier from stray light, thermal agitation, etc. These sources of error can be reduced by making the amplifier more sensitive to signals of the duration and waveshape to be expected from the passage of dust particles then to signals of other waveshape and other frequencies. If such a selective amplifier is being used, the speed of suction should be kept reasonably constant. Furthermore, since the desired signal originates only from that portion of the photocathode which is exposed to the light from the objective 16, whereas the masking signals originate from all portions of the cathode the multiplier may be built, according to the present invention, to have a sensitive cathode of circular shape corresponding to the image of the objective. The other electrodes of the multiplier can then be designed to suit this small size and circular shape of the photocathode.

The range of particle concentrations measured by the instrument is determined by the volume of the inspection zone. This range may be changed by increasing or decreasing this inspection zone. Its volume can be continuously altered by a shutter by which the width of hole 5 or 15 can be adjusted, or a number of round holes of different diameters may be provided on a disc and this disc may be indexed to keep the desired size hole in front of a bigger hole in mask 4 or 14.

If the optical parts change their relative position due to heat dilation or the like, then the inspection zone may change its shape and relative position. As the calibration of the instrument depends on the volume of this zone, it is important to keep this volume unchanged by slight deformations in the instrument. This may be achieved by making one of the holes, say hole 15 to have straight walls perpendicular to the plane of drawing of Fig. 1, and long enough to have the image of these straight walls in the center of inspection chamber 8 longer than the longest dimension in this direction of the image of the other hole (5). Then even if the images move with respect to each other the photocathode will inspect the entire illuminated cross section (as determined by hole 5) over a length determined by the distance between the said straight walls of hole 15, and the volume of the inspection zone will stay practically unchanged.

The drawings represent only one preferred embodiment of the invention, and they are simplified as much as possible. Refinements obvious to those versed in the art, as e. g. fine adjustment of the amplification of the amplifier zero adjustment to balance whatever lack of symmetry exists between the two sides of tube 60, addition of a second diode to balance voltage drop during conduction in diode 50, substituting the voltage divider 98, 99 by a cathode follower tube drawing less current and providing higher sensitivity, improving the filtering where required and so forth were omitted.

I claim:

1. A device for determining the number of particles present in a fluid per unit volume, comprising a light source, an optical system coordinated to said light source for producing an illuminated zone, a light sensitive circuit element, an optical system coordinated to said light sensitive element for producing an observation zone, an inspection zone delimited by the intersection of said observation zone with said illuminated zone, said two optical systems being so chosen that said inspection zone has a volume which is substantially smaller than the average volume pertaining to one particle, an electrical circuit including said light sensitive circuit element and a point so connected to the output of said light sensitive circuit element as to be at a first voltage when said light-sensitive circuit element picks up rays from a particle within said inspection zone and at a second voltage when said light-sensitive element picks up no rays, and means for averaging the voltage present at said point.

2. A device for determining the number of dust particles per unit volume of air, comprising a chamber; means to pass the air to be tested through said chamber; a lamp; a first optical system including a concave mirror, a first mask and a first objective lens; a second optical system including a second objective lens and a second mask; the axes of said two optical systems being inclined to each other, said mirror concentrating rays of said lamp toward said first mask, said first objective forming an image of said first mask inside said chamber and said second objective forming an image of said second mask at substantially the same point of said chamber; a photo-multiplier tube having a cathode, dynodes and an anode being situated so that its cathode faces said second mask; an amplifier having input terminals and output terminals, and an intermediate point adapted to be driven to a first preset voltage during the time that an input signal is present at said input terminals and adapted to be kept at a second preset voltage during the rest of the time, said output terminals being so connected to said intermediate point that the voltage across said output terminals is an indication of the average of the voltage present on said intermediate point; and indicating means; the input terminals of said amplifier being connected to the anode of said multiplier tube and the output terminals of said amplifier being connected to said indicating means.

3. A device as claimed in claim 2, comprising a third lens arranged between said second mask and said photo-multiplier tube, the latter having a photo-electric cathode of circular shape and of a diameter of less than one quarter of an inch, said third lens being adapted to form an image of said second lens over substantially the entire surface of said cathode.

4. A device for indicating the density of particle distribution comprising means for forming a defined zone into which particles may be introduced for relative movement with respect to said zone, means for generating electrical signals of constant amplitude, means responsive to the presence of a particle within said zone to actuate said signal-generating means as long as said particle remains in said zone, the average value of said signals being proportional to that fraction of the time during which said responsive means are actuated, electrically-operated indicating means, and means for transmitting the average value of said generated signals to said indicating means to actuate said indicating means to indicate the density of particle distribution.

5. A device for indicating the density of particle distribution comprising means for forming an inspection zone into which particles may be introduced, means responsive to the presence of a particle in said inspection zone to place an electrical circuit into a first state and to the absence of a particle in said zone to place said electrical circuit into a second state, a member to indicate the density of particle distribution, and means operatively connected to said member and responsive to the average state of said electrical circuit for actuating said member.

6. A device as set forth in claim 5 in which the means responsive to the presence of a particle in said inspection zone is photoelectric means.

7. A method of indicating the number of particles per unit volume in a fluid comprising establishing an inspection zone of a volume substantially smaller than the average volume pertaining to one particle, passing said fluid through said inspection zone, generating signals of constant amplitude during the presence of particles in said inspection zone, and indicating the average value of said signals, said average value being equal to said constant amplitude multiplied by that fraction of the time during which particles were present in said inspection zone, the average volume pertaining to one particle being equal to the volume of said inspection zone divided by said fraction and the number of particles per unit volume being equal to the reciprocal of said average volume pertaining to one particle.

References Cited in the file of this patent

UNITED STATES PATENTS

| | | |
|---|---|---|
| 1,994,768 | Holven et al. | Mar. 19, 1935 |
| 2,480,312 | Wolf | Aug. 30, 1949 |
| 2,486,622 | White | Nov. 1, 1949 |
| 2,494,441 | Hillier | Jan. 10, 1950 |